US012569752B2

(12) United States Patent
Bean et al.

(10) Patent No.: US 12,569,752 B2
(45) Date of Patent: Mar. 10, 2026

(54) GESTURE TRANSLATION WITH MODIFICATION BASED ON GAME CONTEXT

(71) Applicant: Sony Interactive Entertainment Inc., Tokyo (JP)

(72) Inventors: Celeste Bean, San Francisco, CA (US); Glenn Black, San Mateo, CA (US); Victoria Dorn, Hayward, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 184 days.

(21) Appl. No.: 18/296,091

(22) Filed: Apr. 5, 2023

(65) Prior Publication Data

US 2024/0335737 A1     Oct. 10, 2024

(51) Int. Cl.
| | |
|---|---|
| *A63F 13/212* | (2014.01) |
| *A63F 13/245* | (2014.01) |
| *A63F 13/67* | (2014.01) |
| *A63F 13/87* | (2014.01) |

(52) U.S. Cl.
CPC .......... *A63F 13/212* (2014.09); *A63F 13/245* (2014.09); *A63F 13/67* (2014.09); *A63F 13/87* (2014.09)

(58) Field of Classification Search
CPC ...... A63F 13/212; A63F 13/245; A63F 13/67; A63F 13/87
See application file for complete search history.

(56) References Cited

U.S. PATENT DOCUMENTS

| | | | | |
|---|---|---|---|---|
| 5,887,069 A | * | 3/1999 | Sakou | ................... G06F 18/256 |
| | | | | 382/209 |
| 7,720,784 B1 | | 5/2010 | Froloff | |
| 7,785,197 B2 | * | 8/2010 | Smith | ..................... A63F 13/52 |
| | | | | 463/31 |
| 8,523,673 B1 | | 9/2013 | Boyd et al. | |

(Continued)

FOREIGN PATENT DOCUMENTS

| | | |
|---|---|---|
| CN | 106943740 A | 7/2017 |
| CN | 113557069 A | 10/2021 |

(Continued)

OTHER PUBLICATIONS

Emote. Wikipeida.org. Online. Jan. 11, 2023. Accessed via the Internet. Accessed Mar. 19, 2025. <URL: https://en.wikipedia.org/w/index.php?title=Emote&oldid=1132929070> (Year: 2023).*

(Continued)

*Primary Examiner* — Carl V Larsen

(74) *Attorney, Agent, or Firm* — Fish & Richardson P.C.

(57) ABSTRACT

A method is provided for facilitating communication between players in a video game, including the following operations: receiving video of a first player during gameplay of the video game; analyzing the video to identify gestures made by the first player; responsive to identifying the gestures, then translating the gestures into a text communication, wherein translating the gestures uses a context of the video game to determine content of the text communication; presenting the text communication through an in-game chat of the video game, for viewing by a second player during the gameplay of the video game.

18 Claims, 6 Drawing Sheets

(56) References Cited

U.S. PATENT DOCUMENTS

| | | | |
|---|---|---|---|
| 8,751,215 B2 * | 6/2014 | Tardif | G06F 3/017 |
| | | | 704/4 |
| 9,009,747 B2 | 4/2015 | Miller, IV | |
| 9,553,841 B1 * | 1/2017 | Skinner | H04L 12/1895 |
| 9,684,430 B1 * | 6/2017 | Perigault | G06F 3/0237 |
| 10,105,608 B1 * | 10/2018 | George | A63F 13/211 |
| 10,179,291 B2 * | 1/2019 | Thomas | A63F 13/87 |
| 10,290,176 B2 | 5/2019 | Froy et al. | |
| 10,607,134 B1 | 3/2020 | Cosic | |
| 10,915,178 B2 | 2/2021 | Iwanami | |
| 10,946,280 B2 | 3/2021 | Kunieda | |
| 11,126,266 B1 | 9/2021 | Xiao et al. | |
| 11,369,884 B2 | 6/2022 | Niwa et al. | |
| 11,402,917 B2 | 8/2022 | Yokokawa | |
| 12,131,586 B2 * | 10/2024 | Carlock | G06V 20/41 |
| 2002/0178011 A1 * | 11/2002 | Yotoriyama | A63F 13/87 |
| | | | 704/275 |
| 2004/0015608 A1 * | 1/2004 | Ellis | A63F 13/12 |
| | | | 709/246 |
| 2007/0191097 A1 * | 8/2007 | Johnson | A63F 13/30 |
| | | | 715/708 |
| 2007/0191100 A1 * | 8/2007 | Counts | A63F 13/12 |
| | | | 463/42 |
| 2007/0265091 A1 * | 11/2007 | Aguilar, Jr. | A63F 13/45 |
| | | | 463/42 |
| 2007/0298886 A1 * | 12/2007 | Aguilar, Jr. | G07F 17/32 |
| | | | 463/42 |
| 2008/0026845 A1 * | 1/2008 | Aguilar | A63F 13/12 |
| | | | 463/42 |
| 2008/0090659 A1 * | 4/2008 | Aguilar | A63F 13/30 |
| | | | 463/42 |
| 2008/0220870 A1 * | 9/2008 | Zavolas | G07F 17/32 |
| | | | 463/40 |
| 2009/0217211 A1 | 8/2009 | Hildreth et al. | |
| 2010/0112530 A1 | 5/2010 | Schoenbach | |
| 2010/0199228 A1 | 8/2010 | Latta et al. | |
| 2011/0059801 A1 * | 3/2011 | Shiigi | A63F 13/42 |
| | | | 463/43 |
| 2011/0301934 A1 * | 12/2011 | Tardif | G06F 40/45 |
| | | | 382/103 |
| 2012/0054646 A1 * | 3/2012 | Hoomani | H04L 51/04 |
| | | | 715/758 |
| 2013/0084978 A1 * | 4/2013 | Olomskiy | A63F 13/87 |
| | | | 463/31 |
| 2014/0046661 A1 | 2/2014 | Bruner | |
| 2014/0329208 A1 | 11/2014 | Jones et al. | |
| 2016/0005336 A1 * | 1/2016 | Peng | G06F 16/532 |
| | | | 348/14.02 |
| 2016/0042228 A1 * | 2/2016 | Opalka | G06F 3/01 |
| | | | 382/103 |
| 2016/0059120 A1 | 3/2016 | Komorous-King et al. | |
| 2017/0100670 A1 * | 4/2017 | Ma | A63F 13/215 |
| 2017/0173455 A1 * | 6/2017 | Sheil | A63F 13/69 |
| 2017/0282079 A1 * | 10/2017 | De La Cruz | A63F 13/537 |
| 2017/0340972 A1 * | 11/2017 | Seo | A63F 13/87 |
| 2018/0075659 A1 | 3/2018 | Browy et al. | |
| 2018/0161683 A1 * | 6/2018 | Thomas | A63F 13/424 |
| 2018/0169522 A1 * | 6/2018 | Kurabayashi | A63F 13/426 |
| 2018/0188820 A1 | 7/2018 | Zavesky | |
| 2018/0260577 A1 * | 9/2018 | Adams | G06T 5/70 |
| 2018/0345128 A1 | 12/2018 | Ahmed et al. | |
| 2019/0038964 A1 | 2/2019 | Veeramani et al. | |
| 2019/0171716 A1 * | 6/2019 | Weber | H04N 7/15 |
| 2019/0251344 A1 | 8/2019 | Menefee et al. | |
| 2019/0340426 A1 * | 11/2019 | Rangarajan | G06F 18/23 |
| 2019/0391662 A1 | 12/2019 | Yokokawa | |
| 2020/0066251 A1 * | 2/2020 | Kumano | G10L 13/10 |
| 2020/0193714 A1 | 6/2020 | Browy et al. | |
| 2020/0258099 A1 | 8/2020 | Alghamdi | |
| 2020/0276497 A1 | 9/2020 | Nietfeld et al. | |
| 2020/0298131 A1 * | 9/2020 | Pinto | A63F 13/79 |
| 2020/0380793 A1 | 12/2020 | Browy et al. | |
| 2021/0034846 A1 * | 2/2021 | Ko | G06N 3/082 |
| 2021/0146255 A1 * | 5/2021 | Taylor | G06V 40/171 |
| 2021/0339151 A1 | 11/2021 | Stafford et al. | |
| 2021/0390289 A1 * | 12/2021 | Yang | G06V 10/82 |
| 2022/0096937 A1 * | 3/2022 | Dorn | A63F 13/79 |
| 2022/0165013 A1 | 5/2022 | Velez et al. | |
| 2022/0171960 A1 * | 6/2022 | Nelson | A63F 13/87 |
| 2022/0188538 A1 * | 6/2022 | Vieira Rocha | G06F 40/10 |
| 2022/0236795 A1 | 7/2022 | Jonker et al. | |
| 2022/0327309 A1 * | 10/2022 | Carlock | G09B 21/009 |
| 2022/0343576 A1 * | 10/2022 | Marey | G10L 25/63 |
| 2022/0362680 A1 | 11/2022 | Stafford et al. | |
| 2023/0087879 A1 * | 3/2023 | An | A63F 13/87 |
| | | | 345/474 |
| 2023/0281258 A1 * | 9/2023 | Serletic, II | G06F 16/953 |
| | | | 707/706 |
| 2024/0335740 A1 * | 10/2024 | Bean | A63F 13/42 |
| 2024/0367034 A1 | 11/2024 | Tokubo et al. | |
| 2024/0367055 A1 | 11/2024 | Black et al. | |
| 2024/0375011 A1 | 11/2024 | Black et al. | |

FOREIGN PATENT DOCUMENTS

| | | | |
|---|---|---|---|
| EP | 3979050 A1 | 6/2022 | |
| JP | 2011-212296 A | 10/2011 | |
| JP | 2013-135761 A | 7/2013 | |
| JP | 2020-031903 A | 3/2020 | |
| JP | 2020-065656 A | 4/2020 | |
| JP | 2020-513960 A | 5/2020 | |
| JP | 2020-177438 A | 10/2020 | |
| JP | 2022-522402 A | 4/2022 | |
| KR | 102304608 B1 | 9/2021 | |
| WO | WO 2017081896 A1 | 5/2017 | |
| WO | WO 2020176106 A1 | 9/2020 | |

OTHER PUBLICATIONS

PCT/US2024/020673 Notification of Transmittal of the International Search Report and the Written Opinion of the International Searching Authority, or the Declaration, PCT/ISA/220, and the International Search Report, PCT/ISA/210, Jul. 12, 2024.

Uzma et al., "Advances in machine translation for sign language: approaches, limitations, and challenges," Neural Computing, May 18, 2021, 33(21):1-43.

* cited by examiner

GESTURE TRANSLATION WITH MODIFICATION BASED ON GAME CONTEXT

BACKGROUND OF THE INVENTION

The video game industry has seen many changes over the years. As technology advances, video games continue to achieve greater immersion through sophisticated graphics, realistic sounds, engaging soundtracks, haptics, etc. Players are able to enjoy immersive gaming experiences in which they participate and engage in virtual environments, and new ways of interaction are sought. Furthermore, players may stream video of their gameplay for spectating by spectators, enabling others to share in the gameplay experience.

Multiplayer video games often provide in-game chat features to allow players to communicate with each other during gameplay. However, players may face difficulties in communicating effectively, given the fast-paced nature of gameplay.

It is in this context that implementations of the disclosure arise.

SUMMARY OF THE INVENTION

Implementations of the present disclosure include methods, systems and devices for gesture translation with modification based on game context.

In some implementations, a method is provided for facilitating communication between players in a video game, including the following operations: receiving video of a first player during gameplay of the video game; analyzing the video to identify gestures made by the first player; responsive to identifying the gestures, then translating the gestures into a text communication, wherein translating the gestures uses a context of the video game to determine content of the text communication; presenting the text communication through an in-game chat of the video game, for viewing by a second player during the gameplay of the video game.

In some implementations, translating the gestures includes generating a text translation based on the gestures and modifying the text translation based on the context of the video game to determine the content of the text communication.

In some implementations, modifying the text translation is configured to modify a sentiment of the text translation.

In some implementations, modifying the text translation includes modifying one or more of a font style, capitalization, or punctuation in the text translation.

In some implementations, modifying the text translation includes augmenting the text translation with one or more emojis.

In some implementations, using the context of the video game is configured to determine a sentiment of the content of the text communication.

In some implementations, the gestures include signed communications made in a sign language by the first player, and wherein identifying the gestures includes identifying the signed communications in the sign language.

In some implementations, further responsive to identifying the gestures, then triggering performance of an emote by a character in the video game.

In some implementations, a non-transitory computer-readable medium is provided having program instructions embodied thereon that, when executed by at least one computing device, cause said at least one computing device to perform a method for facilitating communication between players in a video game, said method including: receiving video of a first player during gameplay of the video game; analyzing the video to identify gestures made by the first player; responsive to identifying the gestures, then translating the gestures into a text communication, wherein translating the gestures uses a context of the video game to determine content of the text communication; presenting the text communication through an in-game chat of the video game, for viewing by a second player during the gameplay of the video game.

In some implementations, a system for facilitating communication between players in a video game is provided, said system having at least one computing device configured to perform a method including the following operations: receiving video of a first player during gameplay of the video game; analyzing the video to identify gestures made by the first player; responsive to identifying the gestures, then translating the gestures into a text communication, wherein translating the gestures uses a context of the video game to determine content of the text communication; presenting the text communication through an in-game chat of the video game, for viewing by a second player during the gameplay of the video game.

Other aspects and advantages of the disclosure will become apparent from the following detailed description, taken in conjunction with the accompanying drawings, illustrating by way of example the principles of the disclosure.

BRIEF DESCRIPTION OF DRAWINGS

The disclosure may be better understood by reference to the following description taken in conjunction with the accompanying drawings in which.

DETAILED DESCRIPTION OF THE INVENTION

Broadly speaking, implementations of the present disclosure provide a system and method for gesture-to-text translation and modification for in-game chat. In this system, several players play a multiplayer video game using respective user devices that connect over a network to a game server that hosts a session of the multiplayer video game. A first player makes gestures while playing the multiplayer video game. The gestures are tracked and translated into text, and the text is further modified based on the context of the video game. The context of the video game can be analyzed and used to modify aspects of the text translation, such as the sentiment or tone of the text translation. For example, if the game context indicates a tense situation, the system can adjust the wording or content of the text to reflect this. Examples of ways in which the text may be modified include adjusting the text content, and modifying the font style, punctuation, and use of emojis to enhance the presentation of the text. The modified text is then presented through an in-game chat feature of the video game, for example, to second and third players. In some instances, the gestures are sign language. In other instances, the gestures can be other types of recognizable communicative gestures.

Figure 1:
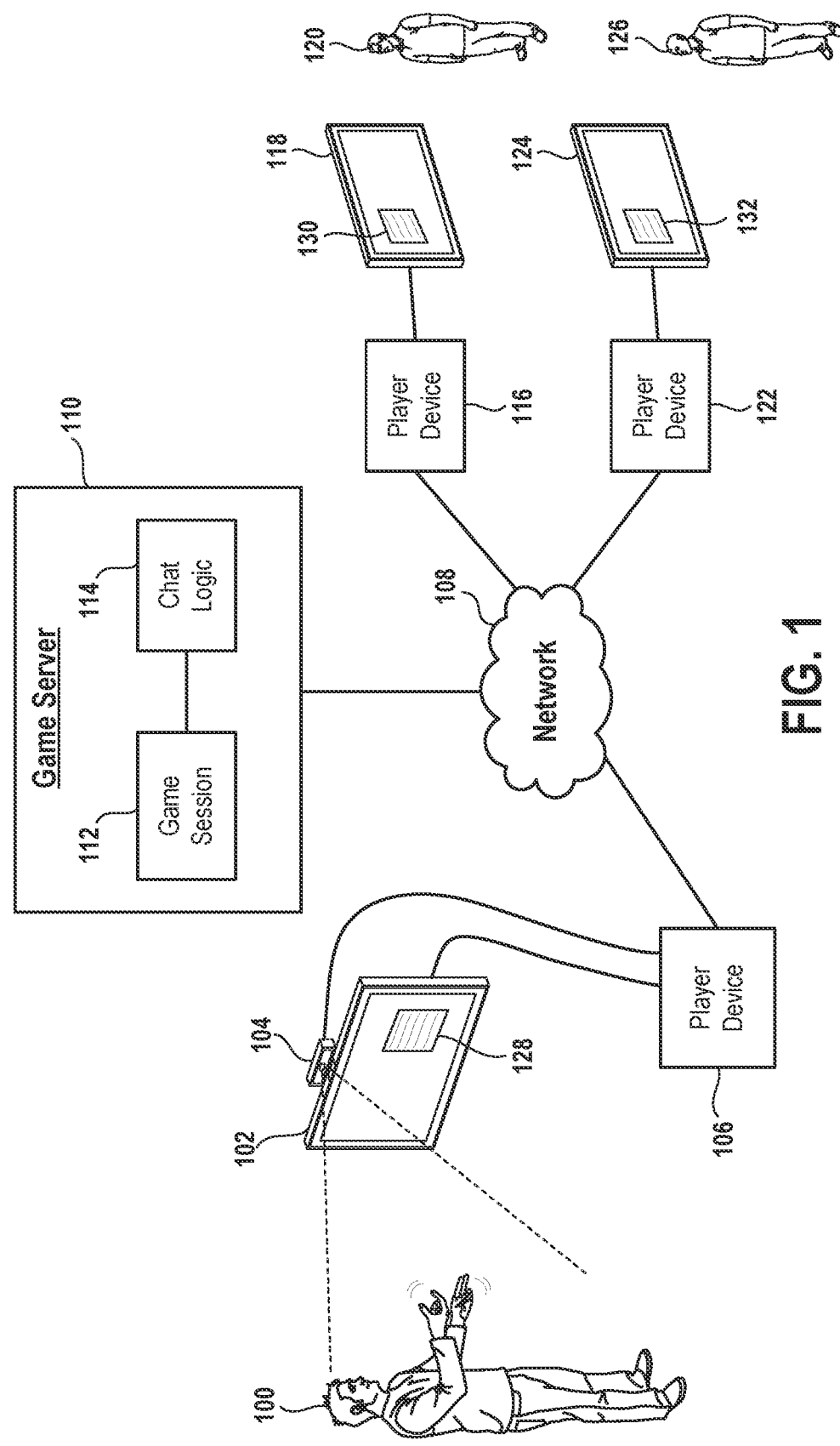
FIG. 1 conceptually illustrates a system for gesture-to-text translation and modification for in-game chat, in accordance with implementations of the disclosure.

FIG. 1 conceptually illustrates a system for gesture-to-text translation and modification for in-game chat, in accordance with implementations of the disclosure.

In the illustrated implementation, players 100, 120, and 126 are engaged in gameplay of a multiplayer video game that is hosted by a game server 110. Player 100 operates a player device 106, which renders gameplay video (e.g. depicting a view of a virtual environment of the video game for the player 100) to a display 102 for viewing by the player 100. Similarly, player 120 operates a player device 116, which renders gameplay video to a display 118 for viewing by the player 120; player 126 operates a player device 122, which renders gameplay video to a display 124 for viewing by the player 120. Examples of player devices include game consoles, personal computers, set-top boxes, streaming devices, etc. In some implementations, a player device and corresponding display may be integrated into the same device (e.g. laptop, tablet, mobile device, etc.).

The player devices communicate over a network 108 with the game server 110, which executes a session 112 of the multiplayer video game. Furthermore, the game server 110 implements chat logic 114 which provides an in-game chat feature for the video game session 112. In some implementations, the in-game chat is rendered in a chat window or overlay, such as chat window 128 shown on display 102 for viewing by player 100, chat window 130 shown on display 118 for viewing by player 120, and chat window 132 shown on display 124 for viewing by player 126.

As the player 100 engages in making various gestures, video of the player 100 is captured by a camera 104 (e.g. RGB camera, depth camera, etc.). Broadly speaking, the captured video is analyzed to identify the gestures made by the player 100, and translate the gestures into text. The text is then further modified based on the current context of the ongoing video game. The modified text is then presented through the in-game chat, and is displayed in the chat windows to the various players.

Figure 2:
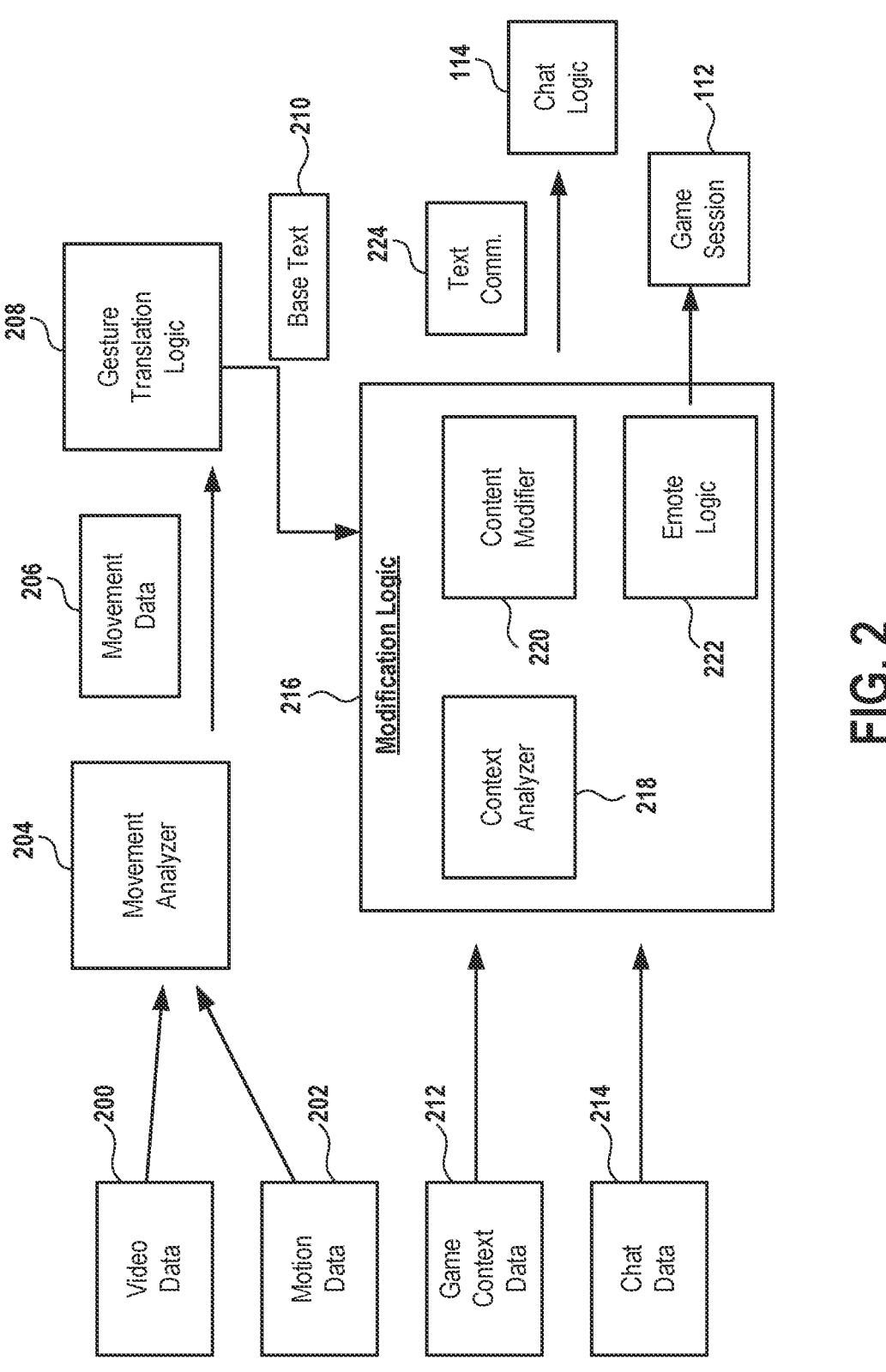
FIG. 2 conceptually illustrates logic for performing gesture-to-text translation and modification for in-game chat, in accordance with implementations of the disclosure.

FIG. 2 conceptually illustrates logic for performing gesture-to-text translation and modification for in-game chat, in accordance with implementations of the disclosure.

As noted, the gestures made by a player while playing the multiplayer video game are tracked using one or more sensors or cameras, which can be incorporated into a player device or a separate device. In some implementations, video data 200 captured by a camera, as well as motion data 202 captured by a motion sensing device, are analyzed by a movement analyzer 204 to determine movement data 206 which identifies the movements of the player. Such movement data 206 may include position, orientation, and movement of the player's hands and fingers, as well as facial expressions and other body movements, postures, etc.

The captured gestures in the form of movement data 206 are then processed by a gesture translation logic 208, which is configured to identify the gestures and translate them into a base/raw text translation 210. In some implementations, the gesture translation logic 208 uses one or more machine learning models to identify the gestures and translate them into the base text translation. In some implementations, machine learning models can be trained using a dataset of known gestures and their corresponding text translations.

A modification logic 216 is implemented to modify the text translation in view of the context of the video game. A game context analyzer 218 analyzes game context data 212, which can include the current game state, player actions, and other relevant factors, to determine the context of the gameplay in which the gestures are made. The game context analyzer 218 may also analyze chat data 214 from the in-game chat feature to determine the context in which the gestures are made. The game context analyzer 218 can use various techniques, such as natural language processing, sentiment analysis, and machine learning, to analyze the game context.

A content modifier 220 modifies the base text translation 210 based on the output of the game context analyzer 218. Examples of modifications can include adjusting the wording or content of the text, changing the font style, adding/changing punctuation, and incorporating selected emojis. The modifications can be predetermined based on the game context, or they can be dynamically generated based on real-time analysis of the game context.

The modified text communication 224 is then presented through the in-game chat feature of the video game by the chat logic 114, which can be accessed by other players in the game. In various implementations, the in-game chat feature can display the text in various formats, such as in a chat window, speech bubbles, text boxes, or subtitles.

It will be appreciated that the content modifier 220 determines the appropriate modifications to the text translation based on the context of the gameplay, as determined by the game context analyzer 218 using the current game state and/or other relevant factors. For example, if it is detected that the player is in a high-intensity combat situation, then the sentiment of the text translation may be modified to convey a sense of urgency or excitement. On the other hand, if the game context analyzer 218 detects that the player is in a more relaxed situation, then the content modifier 220 may modify the sentiment to be more casual or friendly.

It will be appreciated that the game context analyzer 218 may analyze various aspects of the game to determine the context in which gestures are being made. Further, a variety of techniques can be employed to analyze the game context, such as image recognition, object detection, and natural language processing.

One example of how the game context analyzer 218 may analyze the game is by analyzing the game state. The current state of the game can be analyzed, including the positions/movements/activities/states of the players, objects, variables, properties thereof, etc. in the game, to determine the context in which the gestures are being made. Another aspect that the game context analyzer may consider is the environment and current level of the game. The game context analyzer may analyze the features of the environment and challenges of the level to determine the context in which the gestures are being made. The players' scores may also be considered by the game context analyzer. For example, the players' scores may be analyzed to determine the level of competition in the game.

The game context analyzer 218 can use various techniques to analyze the game context. For instance, natural language processing can be used to analyze the text in the game, including the in-game chat and other textual elements. Sentiment analysis can be used to determine the overall emotional tone of the game, such as whether it is positive or negative, intense or relaxed, cooperative or adversarial, etc.

The content modifier 220 takes the output of the game context analyzer 218 and modifies the text translation accordingly. The modifications can include adjusting the wording or content of the text to better fit the game context. Modifying the text translation may also involve adjusting the font style, capitalization, or punctuation of the text to better convey an emotion or intent of the communication in view of the determined context. For instance, the system may use bold or italicized text to emphasize certain words or phrases, or use all caps to indicate shouting or anger. Additionally, the system may use punctuation marks such as exclamation points or question marks to convey emotion or intent.

In some embodiments, the system may also augment the text translation with one or more emojis to further convey emotion or intent. Emojis are small graphical images that are often used in digital communication to express emotions or ideas. For example, a smiley face emoji may be used to indicate happiness or a sad face emoji may be used to indicate an upset feeling. By including emojis in the text translation, the system may better convey the emotional content of the communication based on the game context and improve the overall communication experience between players.

Overall, the system may use a variety of contextual cues to modify the sentiment of the text translation, such as modifying the tone of the text translation in view of detected positive or negative events in the game or based on the tone of the players' interactions. For example, if a player achieves a particularly difficult goal in the game, the system may modify the text translation to magnify an expression of congratulations or admiration for their achievement. Similarly, if one player makes an aggressive move against another player, the system may modify the text translation to enhance an expression of frustration or anger.

For example, if the context of the game is very competitive, the system may modify the text to convey a sense of urgency or excitement. The modified text may use language that is more assertive or challenging, such as using more exclamation marks or capital letters. The system may also use emojis that convey a sense of competitiveness, such as fists or trophies. By modifying the text in this way, the system can enhance the communication between players to help create a more intense and exciting gaming experience for the players.

On the other hand, if the context of the game is cooperative, the system may modify the text to be more encouraging and positive. The modified text may use language that is more supportive or collaborative, such as using more friendly greetings or compliments. The system may also use emojis that convey a sense of teamwork or cooperation, such as hands clasped together or high-fives. By modifying the text in this way, the system can help to foster a sense of camaraderie and teamwork among the players.

In some instances, the sentiment of the modified text may be influenced by the specific situation within the game. For example, if the players are facing a particularly difficult challenge, the system may modify the text to be more encouraging and supportive. And if the players are doing well and succeeding in the game, the system may modify the text to be more celebratory and enthusiastic.

In addition to translating gestures into text, the system may also be configured to trigger the performance of an emote by a character in the video game in response to the identified gestures. Emotes are typically animated gestures made by characters/avatars in the game, and triggering an emote may provide an additional mechanism for expression based on detected gestures, and thereby enhance the communication between players. In the illustrated implementation, emote logic 222 is implemented by the modification logic 216 to trigger an emote in the game session 112, as determined based on gestures and the game context.

Figure 3:
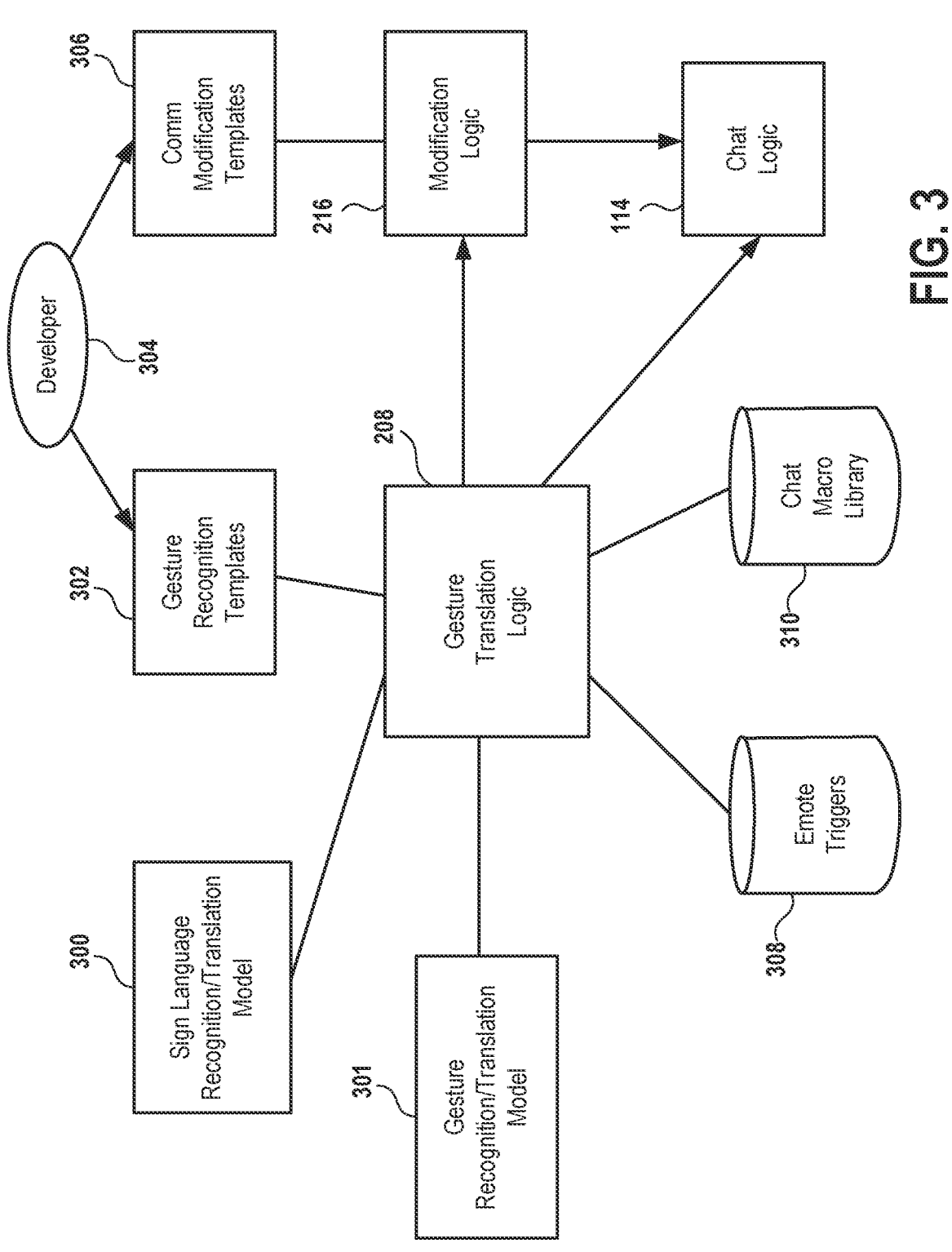
FIG. 3 conceptually illustrates use of models and templates for gesture translation and modification, in accordance with implementations of the disclosure.

FIG. 3 conceptually illustrates use of models and templates for gesture translation and modification, in accordance with implementations of the disclosure.

In some implementations, the gestures made by a player are sign language gestures. In this case, the system can use a sign language recognition/translation model 300 to identify the sign language gestures and translate them into text. The text translation can be further modified based on the game context, as described above. The sign language recognition model can be trained using a dataset of known sign language gestures and their corresponding text translations. It will be appreciated that the sign language recognition model can also be trained to recognize different styles of sign language, such as different signing speeds and spatial aspects, and may be tuned for the particular player's signing style. This can help to ensure that the text translation accurately reflects the sign language gestures made by the player.

In some implementations, the gestures made by the first player are other types of recognizable communicative gestures, such as hand/arm gestures, facial expressions, or body language. In this case, the system can use a gesture recognition/translation model 301 to identify the gestures and translate them into text. The model can be trained using a dataset of known gestures and their corresponding text translations. And more specifically, in some implementations, the gesture recognition model 301 is trained on the specific types of gestures used in the game. The gesture recognition model 301 can also be trained to recognize different styles of gestures and variations in the way that different players make the same gesture, and may be tuned for an individual player. This can help to ensure that the text translation accurately reflects the intended meaning of the gestures, even when the gestures are made by different players.

While separate sign language and non-sign language gesture recognition models have been described, it will be appreciated that in some implementations, a single model can be configured and trained to recognize both sign language and non-sign language gestures.

In some implementations, a developer 304 of a video game can define custom gesture recognition templates 302, which can be configured to define specific gestures to be recognized and how they are to be translated for the video game. In some implementations, the gesture recognition templates can be implemented as part of a software development kit (SDK) of a game engine/platform.

In some instances, emotes are initiated by the chat logic 114 when specific text strings are received. Accordingly, these text strings can define a library of emote triggers 308, which can be accessed by the gesture translation logic 208. The gesture translation logic 208 may map certain recognized gestures to specific emotes, and thus translate a given gesture into its corresponding text string trigger, so that when submitted to the chat logic 114, the emote will be performed. In some implementations, the mapping of gestures to emotes can be defined by the developer 304 using the gesture recognition templates 302.

In some instances, a number of chat macros are defined for a video game, and stored to a chat macro library 310. A chat macro is a predefined chat message that may be triggered in various ways, such as via a hotkey or key/input combination, through a user interface such as a menu or wheel of options, etc. Chat macros enable chat messages to be sent with little effort on the part of the players, so that their gameplay is less disrupted. The contents of chat macros and their triggers can be customized by a given player. In some implementations, the gesture translation logic 208 may map certain recognized gestures to specific chat macros, and thus translate a given gesture into its corresponding chat macro. In some implementations, the mapping of gestures to chat macros can be defined by the developer 304 or customized by a player using the gesture recognition templates 302.

In some implementations, the developer 304 may define communication modification templates 306 for use by the modification logic 216. The communication modification templates 306 can be configured to define aspects of the game context and/or how translated text is to be modified based on the game context. For example, the communication modification templates 306 may define how certain game activities or states or variables are mapped to particular sentiments or particular modifications to the text translation. In some instances, the communication modification templates 306 can define specific modifications to be performed when specific game contexts are detected.

Figure 4:
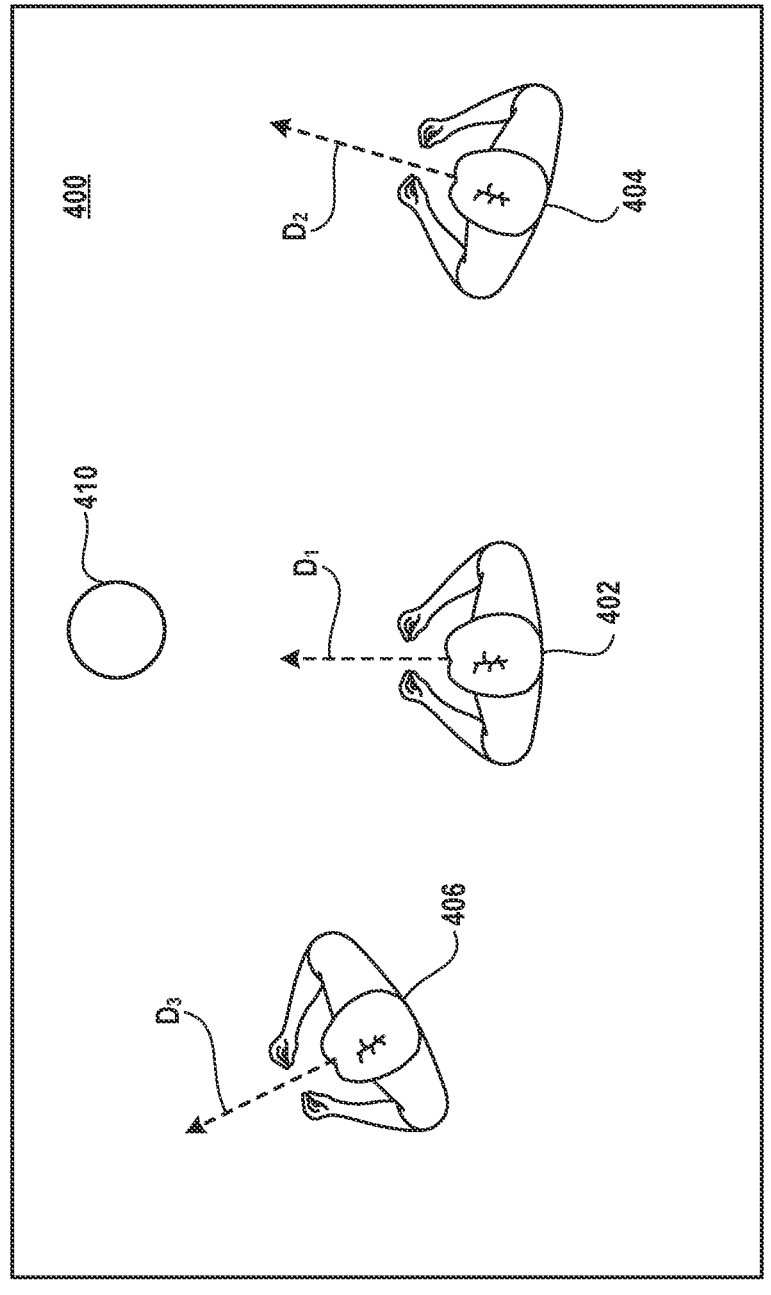
FIG. 4 illustrates a conceptual overhead view of players in a virtual environment, for purposes of implementing directionality in an in-game chat feature, in accordance with implementations of the disclosure.

FIG. 4 illustrates a conceptual overhead view of players in a virtual environment, for purposes of implementing directionality in an in-game chat feature, in accordance with implementations of the disclosure.

In the illustrated implementation, various players are represented by their avatars in a virtual environment 400. A first player having a first avatar 402 is positioned as shown and facing/viewing in a direction D1 in the virtual environment; whereas a second player having a second avatar 404 is facing/viewing in a direction D2 in the virtual environment; and a third player having a third avatar 406 is facing/viewing in a direction D3 in the virtual environment. The player avatars are positioned as shown relative to each other in the virtual environment 400.

It will be appreciated that when a player makes gestures that are translated and presented through in-game chat as discussed above, it may be useful for other players to appreciate where the gesture communication is coming from in the virtual environment. Therefore, in some implementations, the text translation of gesture communications are augmented with directionality information for the various players, indicating where the chat message originates from in the virtual environment.

For example, if the first player makes a gesture communication, then when it is presented in the in-game chat to the second player, because the first player avatar 402 is positioned to the left of the second player avatar 404, then the text translation of the gesture communication is modified to include information indicating that the communication is coming from the left of the second player. Whereas when the communication is presented in the in-game chat to the third player, because the first player avatar 402 is positioned behind the third player avatar 406, then the text translation of the gesture communication is modified to include information indicating that the communication is coming from behind the third player. In this manner, the augmented directional information is customized to each player. In some implementations, the indication of directionality is provided by augmenting the text translation with additional text, symbols, degrees, N o'clock, etc.

In some implementations, the game context can be used to determine and augment the text translation with directional information. For example, in the illustrated implementation, it may be determined that the first player is looking at an object 410 in the virtual environment 400, and the first player's gesture communication relates to the object 410. Accordingly, the system may augment the text translation to include directional information indicating the location of the object 410 relative to the other players 404 and 406 when they receive the in-game chat communication.

Figure 5:
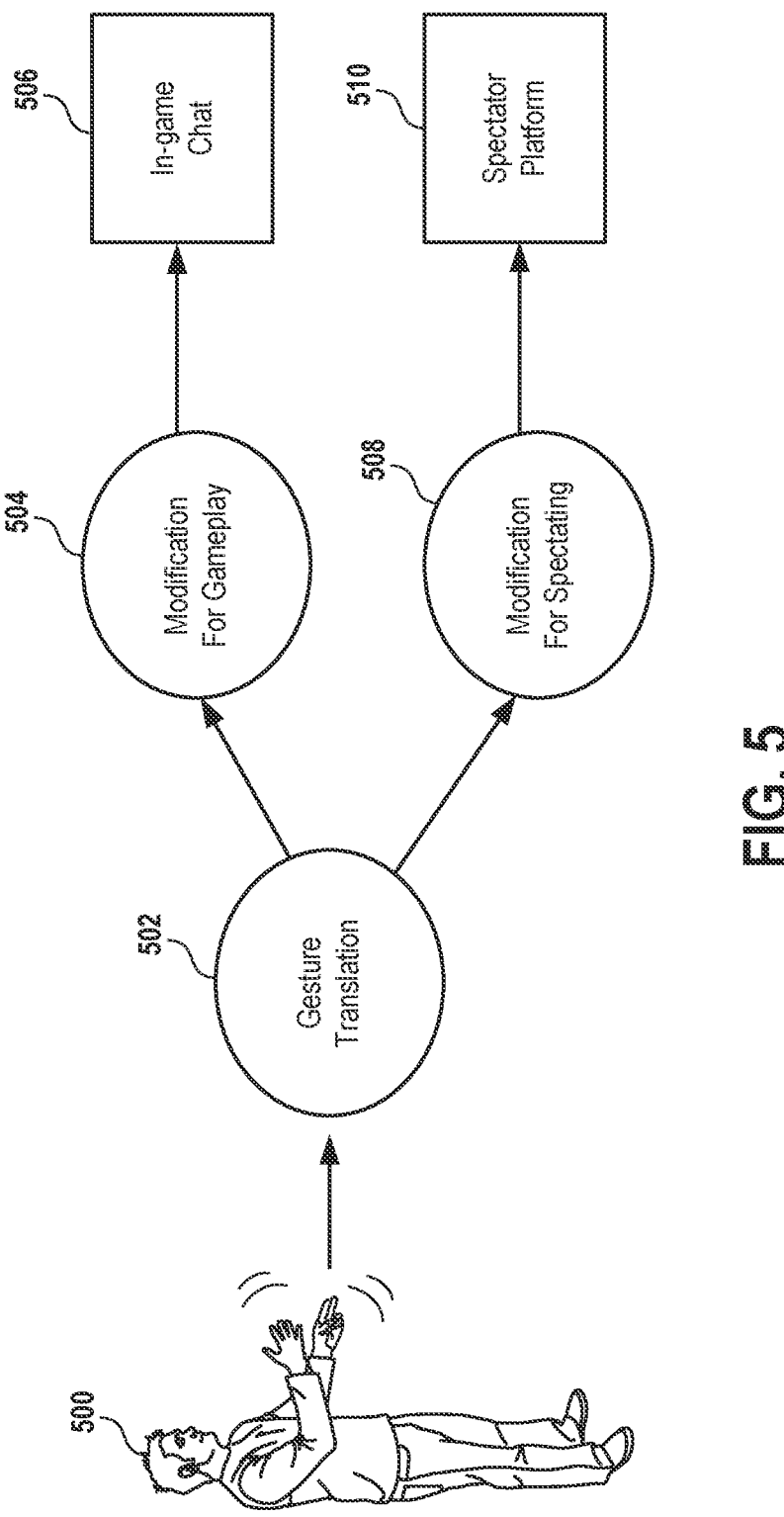
FIG. 5 conceptually illustrates gesture translation and modification for spectator viewing, in accordance with implementations of the disclosure.

FIG. 5 conceptually illustrates gesture translation and modification for spectator viewing, in accordance with implementations of the disclosure.

In some instances, chat communications between players may not be ideal for a spectator to view, as they may contain language that is specific to the players or the game and may not be well understood by a given spectator. Accordingly, in some implementations, chat communications can be modified for viewing by spectators.

In the illustrated implementation, a player 500 makes gesture communications which are translated according to a gesture translation process 502 as has been described, and modified based on game context according to a modification process 504 as has been described. The resulting chat communication is surfaced through the game's in-game chat feature 506.

However, in order to provide chat communications which are more suitable for spectator viewing, in some implementations, a different modification process 508 is performed on the translated text. The modification process 508 can be configured to modify the translated text, based on the game context, but in a manner tailored to the spectators, such as by filtering or adjusting vocabulary or content into a more generally understood form. In some implementations, the filtering is configured to filter out profanity or objectionable content from the text translation. The modified text is shown as part of the in-game chat presented when the gameplay video is streamed through a spectator platform 510 for viewing by spectators.

In some implementations, the modification is tailored based on the experience level of the spectator, so that a spectator that is more experienced, and presumably more familiar with the game, is able to view the chat communications with less filtering or adjustment; whereas a spectator that is less experienced, and presumably less familiar with the game, is shown the chat communications with more filtering or adjustment to promote ease of understanding.

It will be appreciated that the logic and data components described in the present disclosure may be implemented by and across various devices and systems of the present disclosure. The gesture-to-text translation and modification system can be implemented on various types of user devices, including personal computers, gaming consoles, smartphones, and tablets. The user devices can connect to the game server over various types of networks, including local area networks and wide area networks.

It will be appreciated that the system can also be used in various types of multiplayer video games, including role-playing games, first-person shooter games, and sports games. The system can be customized to the specific game context and the types of gestures used in the game.

In addition to analyzing the game context, the system can also use other information to modify the text translation. For instance, the system can incorporate information about the players' preferences, such as their preferred language or communication style. This can help to further personalize the text translation and improve the overall player experience.

The text modification can also be designed to learn and adapt over time based on feedback from the players. For example, if a player frequently modifies the text generated by the system, the engine can learn from these modifications and adjust its output accordingly. This can help to improve the accuracy and effectiveness of the text translation over time.

Moreover, the system can also include a feedback mechanism that allows players to provide feedback on the quality of the text translation and modifications. This feedback can be used to further improve the system and ensure that it meets the needs of the players.

In some implementations, the system can also include a translation feature that automatically translates gestures or text into different languages, allowing players that may prefer different languages to communicate more easily.

In summary, the gesture-to-text translation and game context-based modification provides a powerful tool for enhancing communication between players in a multiplayer video game. By analyzing the game context and modifying the text translation accordingly, the system can help players to better convey their intentions and emotions.

Figure 6:
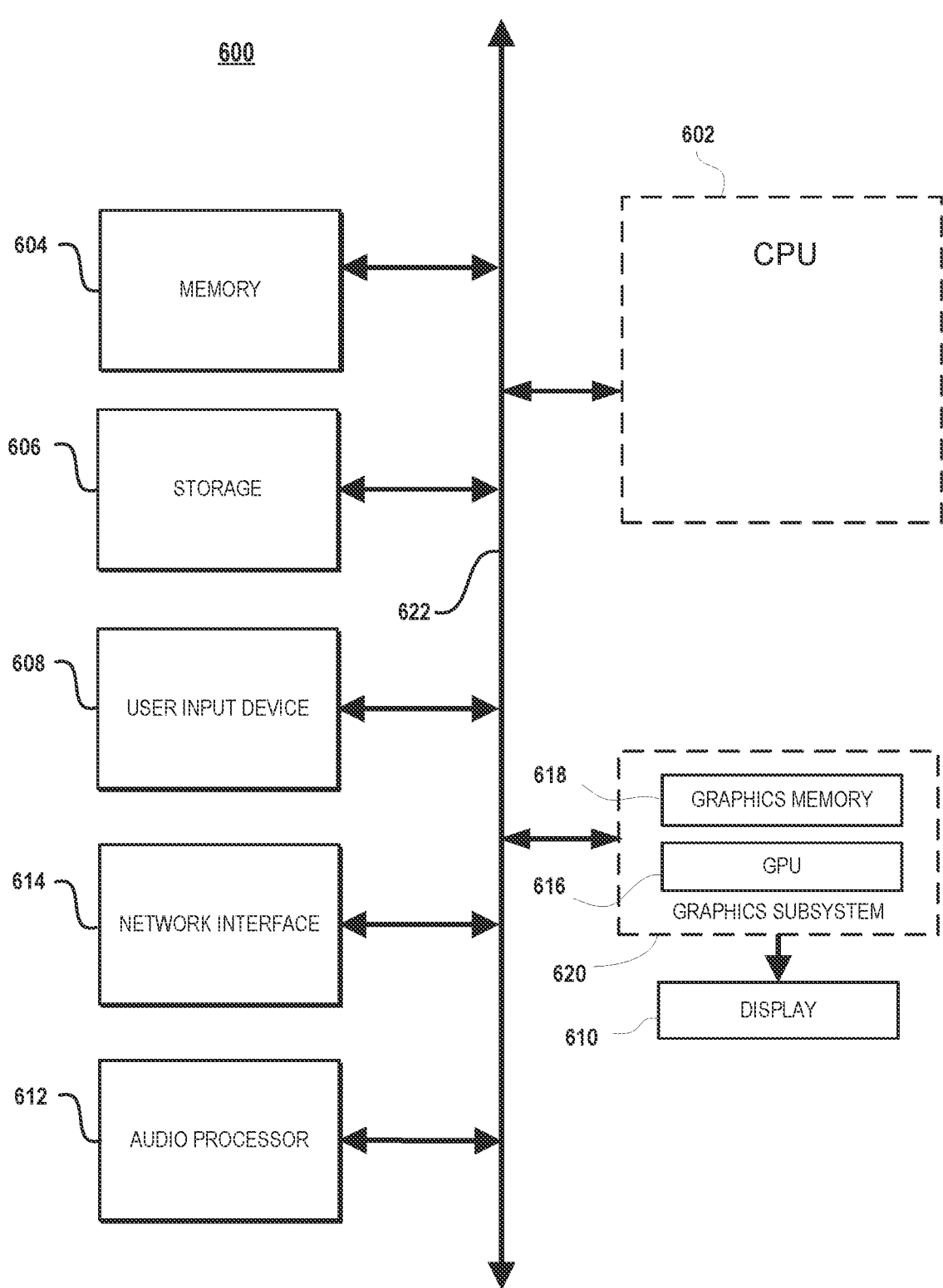
FIG. 6 illustrates components of an example device 600 that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A computer-implemented method comprising:

receiving video of a first player during gameplay of a video game;

analyzing the video to identify one or more gestures made by the first player during the gameplay of the video game;

generating a base textual transcription of the one or more gestures made by the first player during the gameplay of the video game;

determining a current game state of the video game, wherein determining the current game state comprises analyzing in-game chat text using a natural language processor;

selecting a communication modification template that is associated with the current game state of the video game;

generating a modified textual transcription of the one or more gestures made by the first player during the gameplay of the video game using the selected communication modification template that is associated with the current game state; and providing the modified textual transcription to an in-game chat logic of the video game.

2. The method of claim 1, wherein the base textual transcription is generated by one or more machine learning models that are trained using a dataset of known gestures and corresponding text transcriptions.

3. The method of claim 1, wherein determining the current game state comprises determining that the current game state reflects a tense in-game situation.

4. The method of claim 1, wherein determining the current game state comprises determining that the current game state reflects an in-game combat situation.

5. The method of claim 1, wherein determining the current game state comprises determining that the current game state reflects a relaxing in-game situation.

6. The method of claim 1, wherein determining the current game state comprises determining current game scores for different players.

7. The method of claim 1, wherein determining the current game state comprises determining whether the current game state reflects adversarial or cooperative in-game states.

8. The method of claim 1, wherein the communication modification template is selected from among multiple candidate communication modification templates that a developer of the video game has customized for different game states of the video game.

9. The method of claim 1, wherein the communication modification template is selected from among multiple candidate communication modification templates for different game states that have been customized by the first player.

10. The method of claim 1, wherein the communication modification template is implemented as part of a software development kit (SDK) of a game engine platform associated with the video game.

11. The method of claim 1, wherein the communication modification template specifies different modifications that are associated with different current game states.

12. The method of claim 1, wherein the current game state comprises a characteristic of the video game that varies based on game intensity throughout the gameplay.

13. One or more non-transitory computer-readable medium that store instructions which, when executed by one or more computer processors, cause the one or more computer processors to perform operations comprising:

receiving video of a first player during gameplay of a video game;

analyzing the video to identify one or more gestures made by the first player during the gameplay of the video game;

generating a base textual transcription of the one or more gestures made by the first player during the gameplay of the video game;

determining a current game state of the video game, wherein determining the current game state comprises analyzing in-game chat text using a natural language processor;

selecting a communication modification template that is associated with the current game state of the video game;

generating a modified textual transcription of the one or more gestures made by the first player during the gameplay of the video game using the selected communication modification template that is associated with the current game state; and providing the modified textual transcription to an in-game chat logic of the video game.

14. The medium of claim 13, wherein the base textual transcription is generated by one or more machine learning models that are trained using a dataset of known gestures and corresponding text transcriptions.

15. The medium of claim 13, wherein determining the current game state comprises determining that the current game state reflects a tense in-game situation.

16. The medium of claim 13, wherein determining the current game state comprises determining that the current game state reflects an in-game combat situation.

17. The medium of claim 13, wherein determining the current game state comprises determining that the current game state reflects a relaxing in-game situation.

18. A system comprising:

one or more computer processors; and one or more non-transitory computer-readable medium that store instructions which, when executed by the one or more computer processors, cause the one or more computer processors to perform operations comprising:

receiving video of a first player during gameplay of a video game;

analyzing the video to identify one or more gestures made by the first player during the gameplay of the video game;

generating a base textual transcription of the one or more gestures made by the first player during the gameplay of the video game;

determining a current game state of the video game, wherein determining the current game state comprises analyzing in-game chat text using a natural language processor;

selecting a communication modification template that is associated with the current game state of the video game;

generating a modified textual transcription of the one or more gestures made by the first player during the gameplay of the video game using the selected communication modification template that is associ-
ated with the current game state; and providing the modified textual transcription to an in-
game chat logic of the video game.

* * * * *